United States Patent
Tanikawa

[19]

[11] Patent Number: 6,035,358
[45] Date of Patent: *Mar. 7, 2000

[54] UPGRADE CPU MODULE WITH INTEGRAL POWER SUPPLY

[75] Inventor: Roy K. Tanikawa, Irvine, Calif.

[73] Assignee: AST Research, Inc., Irvine, Calif.

[*] Notice: This patent is subject to a terminal disclaimer.

[21] Appl. No.: 09/170,481

[22] Filed: Oct. 13, 1998

Related U.S. Application Data

[63] Continuation of application No. 08/457,531, Jun. 1, 1995, Pat. No. 5,838,929.

[51] Int. Cl.[7] .................................................. G06F 13/00
[52] U.S. Cl. ........................... 710/102; 710/103; 713/340; 713/500; 714/1; 714/14
[58] Field of Search .................................... 355/282, 284, 355/556; 713/300–340, 500, 600; 710/102, 103, 127; 714/1, 14

[56] References Cited

U.S. PATENT DOCUMENTS

| | | | |
|---|---|---|---|
| 4,383,184 | 5/1983 | McFarland | 307/66 |
| 4,551,841 | 11/1985 | Fujita et al. | 395/182.2 |
| 4,615,005 | 9/1986 | Maejima et al. | 395/560 |
| 4,716,463 | 12/1987 | Stacy et al. | 348/730 |
| 4,766,567 | 8/1988 | Kato | 395/182.2 |
| 5,006,790 | 4/1991 | Beverly, II et al. | 324/104 |
| 5,077,686 | 12/1991 | Rubinstein | 395/556 |
| 5,086,387 | 2/1992 | Arroyo et al. | 395/556 |
| 5,142,684 | 8/1992 | Perry et al. | 395/750.05 |
| 5,230,074 | 7/1993 | Canova, Jr. et al. | 395/182.12 |
| 5,297,272 | 3/1994 | Lu et al. | 395/500 |
| 5,301,334 | 4/1994 | Horiuchi | 395/750.02 |
| 5,418,969 | 5/1995 | Matsuzaki et al. | 395/750.04 |
| 5,422,523 | 6/1995 | Roberts et al. | 326/68 |
| 5,426,755 | 6/1995 | Yokouchi et al. | 711/101 |
| 5,455,927 | 10/1995 | Huang | |
| 5,481,697 | 1/1996 | Mathews et al. | 395/556 |
| 5,511,204 | 4/1996 | Crump et al. | 395/750.07 |
| 5,551,012 | 8/1996 | Chuang et al. | |
| 5,572,718 | 11/1996 | Scriber et al. | 395/555 |
| 5,761,479 | 6/1998 | Huang et al. | 395/500 |
| 5,848,250 | 12/1998 | Smith et al. | 355/309 |

OTHER PUBLICATIONS

Bookbuyers Outlet www.bookbuyer.com/aisles/titles/048185.htm.

Hans–Peter Messmer, "The Indispensable PC Hardware Book" 1995, p. 30.

*Primary Examiner*—Paul R. Myers
*Attorney, Agent, or Firm*—Knobbe, Martens, Olson & Bear, LLP

[57] ABSTRACT

A computer processing unit (CPU) module is described. The present CPU module accommodates a CPU and includes a power supply, a power good detection circuit and a clock speed selector, all of which are integral to the CPU module. The power supply provides the CPU module the ability to convert power supplied to the CPU module to power as needed by the CPU. The power good detection circuit provides the CPU module the ability to notify the mother board of a power supply to the CPU which is below the operating voltage of the CPU (e.g., a power failure or insufficient voltage). The clock speed selector provides the CPU module the ability to automatically set the clock speed to that required by the CPU without modification to the BIOS stored on the mother board or changing components.

10 Claims, 1 Drawing Sheet

UPGRADE CPU MODULE WITH INTEGRAL POWER SUPPLY

RELATED APPLICATION

This application is a continuation of U.S. patent application Ser. No. 08/457,531, filed on Jun. 1, 1995 U.S. Pat. No. 5,838,929.

FIELD OF THE INVENTION

The present invention relates to a module (or board) for a microprocessor computer processing unit (CPU), particularly a CPU module which accommodates a CPU and which includes a power supply, a power good detection circuit and a clock speed selector integral to the module.

BACKGROUND OF THE INVENTION

In improving microprocessors (i.e., computer processing units or CPUs) manufacturers change the design to make the CPUs more efficient, faster, etc. Often which such improvements and/or new designs the operating requirements of the CPUs change (e.g., the required operating voltage, the required clock speed, etc.). For example, at one time both the central core and input/output interface (I/O) of Intel® CPUs operated at 5 volts. Then certain CPUs were upgraded and both the central core and I/O interface operated at 3.3 volts. The central core and I/O interface of a new Pentium® CPU by Intel® operates at 2.9 volts and 3.3 volts respectively. This trend of operating voltage changes as CPUs are upgraded is expected to continue. The trend of the central core and the I/O interface of a CPU requiring different voltages is also expected to continue.

Commonly when the CPU in a computer is upgraded the mother board of the computer must be manipulated to remove the existing CPU, to install a new CPU, and to accommodate the new CPU (e.g., reconfigure the mother board to adjust for different power and/or clock speed requirements, etc.). To facilitate the removal, installation, and accommodation of CPUs it is known to provide CPUs on an upgrade CPU module (or board) separate from the mother board whereby an old CPU can be removed by simple removal of the entire CPU module and a new CPU can installed by simple installation of an upgrade CPU module.

To further facilitate the ability to upgrade a computer system through the installation of an upgrade CPU, upgrade CPU modules have been manufactured with integral power supplies to convert the voltage supplied by the mother board to the CPU from 5 volts to 3.3 volts as appropriate for the particular CPU (core and/or I/O interface) provided on the CPU module. The power supply provided on the CPU module can also convert the voltage supplied externally from an AC to DC wall adapter (18 volt DC output) or internally from a battery (12 volt DC) to 3.3 volt DC current as appropriate for the CPU core and/or I/O interface. Thus, a CPU module can be manufactured with a power supply to accommodate the CPU on the CPU module without having to change the power supply on the mother board.

However, such prior CPU module (even those with integral power supplies) do not provide feedback information to the mother board (e.g., do not communicate that the power supply to the CPU is below the operating voltage of the CPU). Therefore, there can be sufficient power for the mother board to run and the mother board does not recognize if the power level has not stabilized sufficiently for the CPU to run (e.g., due to a module power supply failure). Therefore, the CPU can be stopped due to a power failure or insufficient voltage while the rest of the mother board continues to run without identifying the CPU power problem. Thus, a power failure message is not communicated to the mother board prompting it to turn off the power supply and protect the rest of the mother board. This situation also can frustrate attempts to identify what is wrong with the inoperable computer.

In addition, such CPU modules (even those with integral power supplies) do not accommodate for upgrade CPUs which require a clock speed different from the clock speed for which the mother board was configured for the original CPU. While the clock speed of a computer can typically be manipulated by modifying the BIOS (typically stored on a chip on the mother board) or changing components, such modification requires the intervention of a knowledgeable person. It is beneficial if the clock speed can be automatically set at the speed required by the new CPU without manipulation of the BIOS or changing components. However, such a feature has not yet been provided.

Prior CPU modules have not provided adequate solutions to these problems.

SUMMARY OF THE INVENTION

The present invention provides a CPU module which affords solutions to the problems described above. Particularly, the present invention provides a CPU module that accommodates a CPU and includes a power supply, a power good detection circuit and a clock speed selector, all integral to the CPU module.

The power supply of the present invention provides the CPU module the ability to convert power supplied to the CPU module by the mother board or an internal or external source into the power required by the particular CPU (e.g. AC to DC and 18, 12, 5.0, or 3.3 volts to 2.9 volts).

The power good detection circuit of the present invention provides the CPU module the ability to communicate to the mother board that the supply of power is below the operating voltage of the CPU (e.g., a power failure or insufficient voltage to the CPU).

The clock speed selector of the present invention provides the CPU module the ability to automatically set the clock speed to that required by the particular CPU or the CPU module.

Accordingly, it is a primary object of the present invention to provide an improved CPU module with an integral power supply.

It is an additional object of the present invention to provide a CPU module with an integral power good detection circuit.

It is a further object of the present invention to provide a CPU module with an integral clock speed selector.

Other objects and features of the present invention will become apparent from consideration of the following description taken in conjunction with the accompanying drawings.

DETAILED DESCRIPTION OF THE PREFERRED EMBODIMENT

Figure 1:
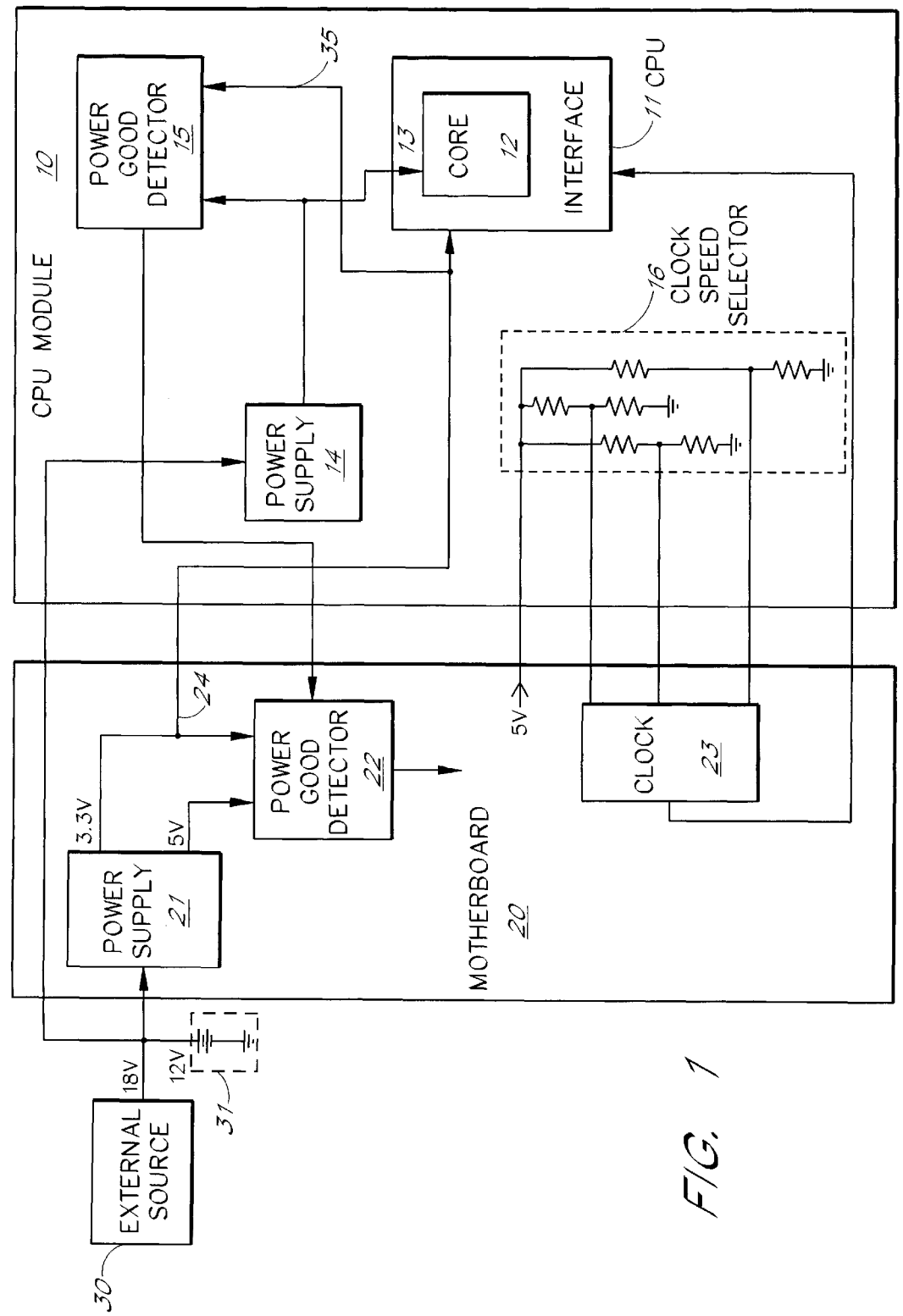
FIG. 1 is a block diagram showing the CPU module of the present invention.

As is shown in FIG. 1, the preferred embodiment of the present invention comprises a CPU module (or board) 10 which accommodates a CPU 11 (comprising a CPU core 12 and an I/O interface 13) and which includes a CPU module power supply 14, a CPU module power good detection circuit 15, and a clock speed selector 16, all of which are integral to the CPU module 10 and connectable to a mother board 20. As is described above, arranging the CPU 11 on a CPU module 10 provides a convenient mode of removing a CPU from and installing a new CPU onto a mother board.

As is also shown in FIG. 1, the mother board 20 includes a mother board power supply 21, a mother board power good detection circuit 22, and a clock 23. Although FIG. 1 shows the mother board 20 and the CPU module 10 as separate, the CPU module 10 is attachable (electrically and physically) to the mother board 20.

As is typical in the industry, the mother board 20 is supplied with power either from an external source 30 (e.g., a wall plug outlet) and/or from a battery source 31 which can be internal or external. The power is supplied to the mother board power supply 21 which then converts the power to that voltage required by the components (e.g., AC to DC and 18 volts or 12 volts to 5 volts and/or 3.3 volts). The mother board power supply 21 also provides power to the mother board power good detection circuit 22 which checks the power supplied and ensures that it is within the tolerance range of the components receiving power. Typically, if the power is below operating voltage, the power good detection circuit 22 communicates this to the mother board 20 which then, typically, indicates the same and waits until the power is sufficient. In the preferred embodiment of the present invention the mother board power supply 21 also supplies power to the I/O interface 13 of the CPU module 10, for example, via line 24 in FIG. 1.

In the preferred embodiment of the present invention, as shown in FIG. 1, the CPU module 10 is supplied power as is the mother board 20: from either an external source 30 (e.g., a wall plug outlet) and/or a battery source 31 which can be internal or external. The power is supplied to the CPU module power supply 14 which then converts the power to that voltage required by the CPU core 12 (e.g., AC to DC and 18 volts or 12 volts to 3.3. or 2.9 volts depending on the power supplied and on the particular CPU) and provides the converted power to the CPU core 12. The CPU module power supply 14 also provides power to the CPU module power good detection circuit 15 which checks the power supplied and ensures that it is within the operating voltage level of the CPU core 12. The CPU module power good detection circuit 15 communicates if the power is not at the operating voltage level to the mother board power good detection circuit 22 which then, as is described above, typically, indicates the same to the mother board 20 and waits until it is at the proper level.

As is described above, I/O interface 13 is supplied power by the mother board power supply 21 and the power supplied by the mother board power supply 21 is checked by the mother board power good detection circuit 22. As is shown in FIG. 1, the preferred embodiment of the present invention includes a redundant check on this power supply to the I/O interface 13 by the CPU module power good detection circuit 15 via, for example, line 35. Although the power for the I/O interface 13 is preferably supplied from the mother board 20 as shown, CPU module 10 of the present invention can be configured such that the I/O interface 13 is supplied power by a second CPU module power supply similar to CPU module power supply 14.

The inclusion of the CPU module power good detection circuit 15 helps prevent the situation where feedback information about whether the power supply to the CPU is below the operating voltage of the CPU is not communicated to the mother board 20. Therefore, the mother board recognizes if there is insufficient power for the CPU to run (e.g., due to a module power supply failure) and is able to turn off the power supply and protect the rest of the mother board.

In general, the clock 23 on the mother board 20 provides a clock cycle for all components requiring the same, including, typically, the CPU 11. However, as is described above, the clock speed of the clock 23 (i.e., the number of clock cycles per time period) is, typically, not easily adjusted (e.g., without modifying the BIOS or chancing components) and, therefore, upgrading the CPU 11 to one which requires a clock speed different from the clock speed for which the mother board clock 23 was configured is, typically, not easily accomplished. The speed of a clock such as clock 23 (which is preferably a phase locked loop rather than a crystal oscillator) is typically dependent on the voltage supplied to it.

The preferred embodiment of the present invention, as shown in FIG. 1, includes a clock speed selector 16 (i.e., as a voltage divider circuit). The clock speed selector 16 is preferably provided power by the mother board 20. The clock speed selector 16 uses the power supplied by the mother board to provide the selection circuit with power which when provided to the clock 23 dictates the speed at which the clock 23 must be set for the particular CPU 11 on the CPU module 10. The clock speed selector 16 enables the CPU module 10 to be manufactured with the proper clock speed selector 16 for the CPU 11 to be provided thereon. Therefore, the preferred embodiment of the present invention enables the clock speed to be automatically set at the speed required by the CPU 11 without manipulation of the BIOS or changing components.

Thus, the preferred embodiment of the present invention provides a CPU module 10 which solves many problems of the prior art. Specifically, the CPU module 10 accommodates a CPU 11 and includes a CPU module power supply 14, a CPU module power good detection circuit 15, and a clock speed selector 16, all of which are integral to the CPU module 10. The CPU module power supply 14 provides the CPU module 10 the ability to convert power supplied to the CPU module 10 by the mother board 20 or internal or external sources 30 and 31 into the power required by the particular CPU 11. The CPU module power good detection circuit 15 provides the CPU module 10 with the ability to communicate to the mother board 20 that the supply of power is below the operating voltage of the CPU 11 (e.g., a power failure or insufficient voltage to the CPU). The clock speed selector 16 provides the CPU module 10 the ability to automatically set the clock speed to that required by the particular CPU 11 on the CPU module 10.

Thus, the CPU module 10 of the present invention facilitates upgrading and/or replacing the CPU of a computer system since the adjustment of all variable parameters affected by such an upgrade or replacement is handled by the CPU module 10 which is assembled and set by the manufacturer. This provides convenience and efficiency to anyone replacing the CPU of a computer system, particularly to end users as the end user need not modify parameters.

While a preferred embodiment of the present invention has been shown and described, various modifications may be made without departing from the scope of present invention, and all such modifications and equivalents are intended to be covered.

What is claimed is:

1. A computer system comprising:

a motherboard configured to receive a processing unit module;

a power supply configured to supply power to a local power supply on said processing unit module via said motherboard;

a circuit configured to be coupled via said motherboard to a power good detection signal provided by said module, wherein said circuit takes protective action when said power good signal indicates that the power supplied by said local power supply fails to meet at least one parameter; and a clock circuit configured to interface via said motherboard to a clock control signal provided by said module, wherein, in response to said clock control circuit, said clock circuit generates a clock signal provided to said module whose frequency is related to said clock control signal.

2. The computer system as defined in claim 1, further comprising said processing unit module.

3. A computer system comprising:

a motherboard configured to receive a processing unit module;

said processing unit module:

a first power supply configured to supply power to a local power supply on said processing unit module via said motherboard; and a circuit configured to be coupled via said motherboard to a power good detection signal provided by said module, wherein said circuit takes protective action when said power good signal indicates that the power supplied by said local power supply fails to meet at least one parameter, and wherein said processing unit module comprises a core and an input/output interface;

said local power supply is integral to the module and is configured to receive power from said fist power supply via said motherboard, said local power supply further configured to supply power to the core of the computer processing unit module at a first voltage;

a connection configured to couple said input/output interface to the first power supply via said motherboard to supply power to the input/output interface of the computer processing unit module at a second voltage; and a power good detection circuit integral to the module and configured to check the power supplied to the module by said local power supply, said power good detection circuit providing said power good output signal couplable to said circuit configured to take protective action.

4. A computer system comprising:

a circuit board adapted to receive a computer processing unit module; and a clock circuit configured to receive a clock speed control signal from said computer processing unit module, wherein said clock circuit is configured to generate a clock signal provided to said computer processing module at a frequency determined by said clock speed control signal.

5. The computer system as defined in claim 4, further comprising said computer processing module.

6. A computer system comprising:

a circuit board adapted to receive a computer processing module;

a power supply configured to supply power to a local power supply on said processing unit module via said circuit board;

a circuit configured to be coupled via said circuit board to a power good detection signal provided by said module, wherein said circuit takes protective action when said power good signal indicates that the power supplied by said module power supply fails to meet at least one parameter; and a clock circuit configured to interface via said circuit board to a clock control signal provided by said module, wherein said clock circuit generates a clock signal provided to said module at a frequency determined by said clock control signal.

7. The computer system as defined in claim 6, further comprising said processing unit module.

8. A computer circuit card comprising:

a first card area adapted to receive a processing unit module;

at least a first conductor adapted to couple power from a computer power supply to a local power supply on said processing unit module; and a clock circuit configured to be coupled to a clock speed control signal from said computer processing module, wherein said clock circuit is configured to generate a clock signal provided to said computer processing module at a frequency based on said clock speed control signal.

9. A method of powering a computer module, said method comprising the acts of:

supplying power from a power supply to a local module power supply on said processing unit module via a motherboard;

talking protective action in response to receiving a signal from said processing unit module via said motherboard which indicates that the power supplied by said module power supply fails to meet at least one parameter; and generating a clock signal provided to said module via said motherboard, wherein the frequency of said generated clock signal is established, in response to a clock control signal received from said processing unit module.

10. A method of providing a clock to a computer module via a motherboard, said method comprising the acts of:

receiving a clock speed control signal from said computer processing module via a motherboard;

controlling the speed of said clock in response to said clock speed control signal provided by said computer module; and providing said clock to said computer processing module via said motherboard.

* * * * *

UNITED STATES PATENT AND TRADEMARK OFFICE
CERTIFICATE OF CORRECTION

PATENT NO. : 6,035,358
DATED : March 7, 2000
INVENTOR(S) : Roy K. Tanikawa

Page 1 of 1

It is certified that error appears in the above-identified patent and that said Letters Patent is hereby corrected as shown below:

In column 5 at line 35, change "said fist" to --first--.

In column 6 at line 42, change "talking protective" to --taking protective--.

Signed and Sealed this

Fifth Day of June, 2001

*Attest:*

*Attesting Officer*

NICHOLAS P. GODICI
*Acting Director of the United States Patent and Trademark Office*

UNITED STATES PATENT AND TRADEMARK OFFICE
CERTIFICATE OF CORRECTION

PATENT NO. : 6,035,358
DATED : March 7, 2000
INVENTOR(S) : Roy K. Tanikawa

It is certified that error appears in the above-identified patent and that said Letters Patent is hereby corrected as shown below:

Column 5,
Line 39, change "said fist" to -- said first --.

Column 6,
Line 42, change "talking protective" to -- taking protective --.

This certificate supersedes Certificate of Correction issued June 5, 2001.

Signed and Sealed this

Twentieth Day of August, 2002

Attest:

JAMES E. ROGAN
Attesting Officer
Director of the United States Patent and Trademark Office